US007839454B2

(12) United States Patent
Rogers (10) Patent No.: US 7,839,454 B2
(45) Date of Patent: Nov. 23, 2010

(54) POST-PROCESSOR DESIGN SUPPORTING NON-FLICKERING INTERLACED DISPLAY

(75) Inventor: Landis Rogers, Kingston, NH (US)

(73) Assignee: Broadcom Corporation, Irvine, CA (US)

( * ) Notice: Subject to any disclaimer, the term of this patent is extended or adjusted under 35 U.S.C. 154(b) by 1163 days.

(21) Appl. No.: 11/299,165

(22) Filed: Dec. 9, 2005

(65) Prior Publication Data

US 2006/0125964 A1 Jun. 15, 2006

Related U.S. Application Data

(60) Provisional application No. 60/635,689, filed on Dec. 13, 2004.

(51) Int. Cl.
*H04N 7/00* (2006.01)
(52) U.S. Cl. ............... 348/634; 348/607; 348/447; 348/497; 348/704
(58) Field of Classification Search ............ 348/634, 348/637, 607, 447, 598, 704, 497
See application file for complete search history.

(56) References Cited

U.S. PATENT DOCUMENTS

| 4,099,179 | A | * | 7/1978 | Hofstein | 342/185 |
|---|---|---|---|---|---|
| 4,513,278 | A | * | 4/1985 | Seitz et al. | 341/138 |
| 4,611,225 | A | * | 9/1986 | Powers | 348/443 |
| 4,724,485 | A | * | 2/1988 | Golab et al. | 348/441 |
| 5,010,413 | A | * | 4/1991 | Bahr | 348/383 |
| 5,861,864 | A | * | 1/1999 | Jensen | 715/203 |
| 5,914,753 | A | * | 6/1999 | Donovan | 348/441 |
| 6,028,589 | A | * | 2/2000 | Mehra et al. | 345/603 |
| 6,040,871 | A | * | 3/2000 | Andersson | 348/510 |
| 6,061,094 | A | * | 5/2000 | Maietta | 348/446 |
| 6,166,772 | A | * | 12/2000 | Voltz et al. | 348/448 |
| 6,392,642 | B1 | * | 5/2002 | Wu | 345/213 |
| 6,504,577 | B1 | * | 1/2003 | Voltz et al. | 348/448 |
| 6,670,994 | B2 | * | 12/2003 | Voltz et al. | 348/448 |
| 6,836,294 | B2 | * | 12/2004 | Miller et al. | 348/458 |
| 7,262,806 | B2 | * | 8/2007 | MacInnis et al. | 348/441 |
| 7,289,170 | B2 | * | 10/2007 | Jun | 348/790 |
| 7,454,123 | B2 | * | 11/2008 | Buxton | 386/109 |
| 2005/0110419 | A1 | * | 5/2005 | Witmer | 315/169.2 |

* cited by examiner

*Primary Examiner*—Brian P Yenke
(74) *Attorney, Agent, or Firm*—McAndrews Held & Malloy, Ltd.

(57) ABSTRACT

Disclosed herein is a method and apparatus for preventing and eliminating undesirable effects in displayed video. The method may include receiving video information and decoding the video information. The method may also include processing the number of illuminable lines associated with a video frame and blanking a remainder of the illuminable lines. Blanking the remainder of the illuminable lines may prevent and eliminate undesirable effects in the displayed video. The illuminable lines may be processed, such that each field may comprise an even number of corresponding, illuminable lines 530. The fields, however, are not required to have the same number of lines. In an embodiment according to the present invention, no active lines in one field may be below a blanked line in a corresponding field. The apparatus may include a video processor including a video post-processing unit adapted to determine a number lines to be illuminated on a particular video display device and a number of lines to be blanked in order to prevent and eliminate undesirable effects in the displayed video.

14 Claims, 5 Drawing Sheets

POST-PROCESSOR DESIGN SUPPORTING NON-FLICKERING INTERLACED DISPLAY

RELATED APPLICATIONS

This application claims priority to "Method of Displaying Multimedia Content", Provisional Application for U.S. Pat., Ser. No. 60/635,689, filed Dec. 13, 2004, by Landis Rogers, incorporated herein by reference in its entirety, for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A television (TV) screen is a glass vacuum tube, wherein the inside front of the tube is covered with a mesh of red, green, and blue phosphor dots. The back of the tube comprises three electron guns adapted to shoot three beams of electrons at the phosphor dots.

When the electrons hit the phosphor dots, the phosphor dots glow and a color picture is produced. Increasing the beam strength at various locations on the inside of the tube (screen) for the three different colors increases the brightness and also permits the colors to mix forming new colors and creating lifelike images.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found a method of preventing and eliminating undesirable effects in displayed video. The method may comprise receiving video information and decoding the video information. The method may also comprise processing a number of illuminable lines associated with a video frame and blanking a remainder of the illuminable lines. Blanking the remainder of the illuminable lines may prevent and eliminate undesirable effects in the displayed video.

In an embodiment according to the present invention, receiving the video information may comprise receiving the video information from a video input device.

In an embodiment according to the present invention, the video input device may comprise a wired or wireless communication device adapted to transmit video information.

In an embodiment according to the present invention, the method may further comprise storing the video information in a video buffer memory until the video information is decoded.

In an embodiment according to the present invention, decoding the video information may further comprise decoding the video information field-by-field.

In an embodiment according to the present invention, dividing the number of illuminable lines associated with a video frame may be based upon a number of illuminable lines available in an associated video display device.

In an embodiment according to the present invention, the method may further comprise processing the video information into a processed top field comprising an even number of illuminable lines and a processed bottom field comprising an even number of illuminable lines, and wherein each field may comprise at least one blanked line.

In an embodiment according to the present invention, the method may further comprise calculating a number of lines to be illuminated in one of the top field and the bottom field as follows:

$$M_T = n/2 - 1,$$

wherein $M_T$ comprises the number of lines to be illuminated in one of the top field and the bottom field and n comprises a total number of illuminable lines associated with a particular video display device.

In an embodiment according to the present invention, the method may further comprise calculating a number of lines to be illuminated in the top field and the bottom field as follows:

$$M_B = (n-1)/2;$$

wherein $M_B$ comprises the number of lines to be illuminated in one of the top field and the bottom field and n comprises a total number of illuminable lines associated with a particular video display device.

In an embodiment according to the present invention, the method may further comprise calculating a number of lines to be blanked as follows:

$$B = n - (M_B + M_T);$$

wherein $M_B$ comprises the number of lines to be illuminated in one of the top field and the bottom field, $M_T$ comprises the number of lines to be illuminated in another of the top field and the bottom field, n comprises a total number of illuminable lines associated with a particular video display device, and B comprises a total number of lines to be blanked.

Aspects of the present invention may be found in a video processor adapted to prevent and eliminate undesirable effects in a displayed video. The video processor may comprise a video decoder for one of decoding and decompressing one of encoded and compressed video information and a video post-processing unit adapted to determine a number lines to be illuminated on a particular video display device and a number of lines to be blanked in order to prevent and eliminate undesirable effects in the displayed video.

In an embodiment according to the present invention, the video processor may further comprise a video input device adapted to transmit video to the video processor.

In an embodiment according to the present invention, the video input device may comprise one of a wired and wireless communication device.

In an embodiment according to the present invention, the video processor may further comprise a video buffer memory for storing received video information.

In an embodiment according to the present invention, the video processor may further comprise an output engine adapted to assemble processed video information for transmission via a video output to a display device.

In an embodiment according to the present invention, the video processor may be adapted to process the video information into a processed top field comprising an even number of illuminable lines and a processed bottom field comprising an even number of illuminable lines.

In an embodiment according to the present invention, the video processor may be adapted to process the video information wherein each field comprises at least one blanked line.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
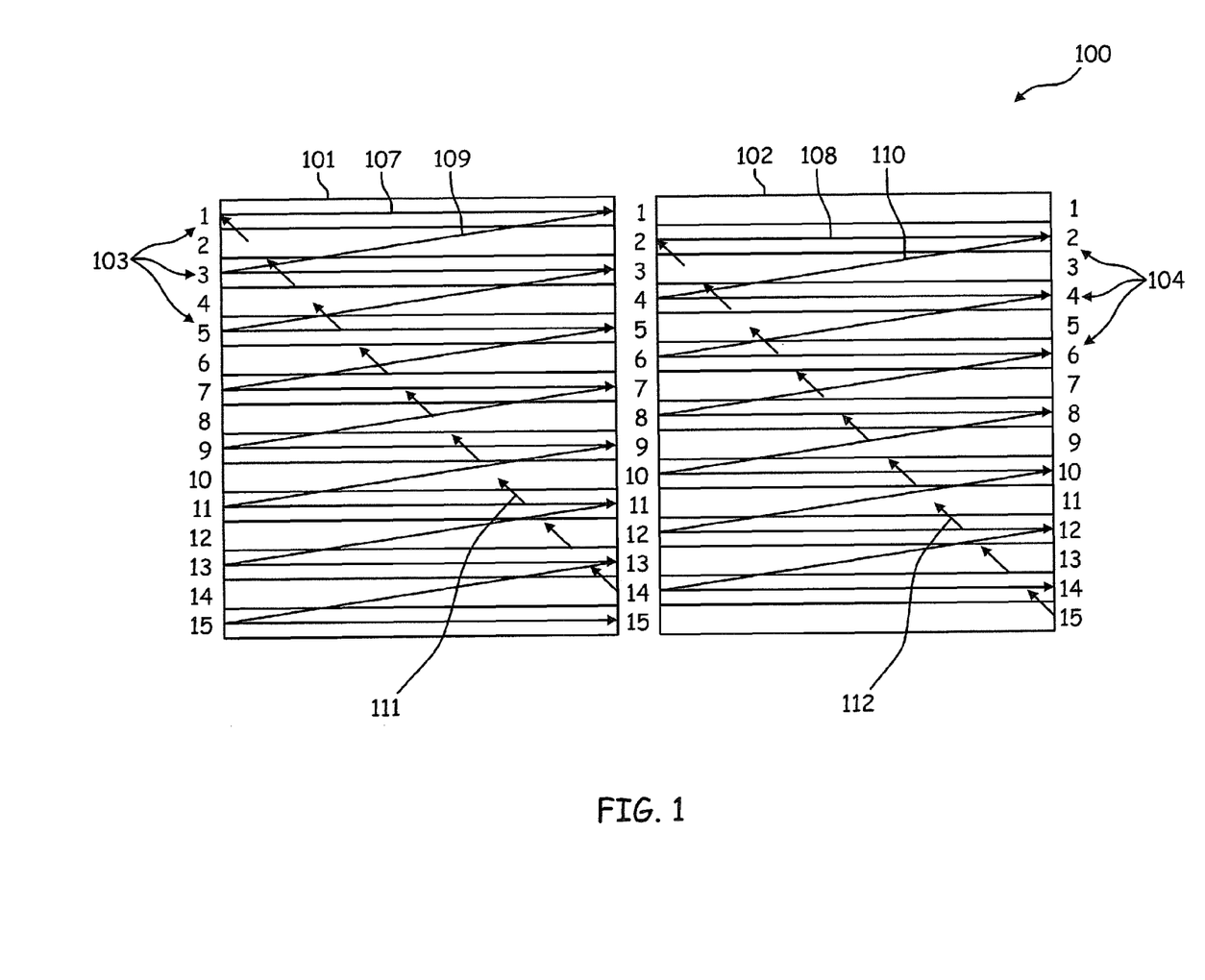
FIG. 1 illustrates producing a video display on a television screen according to an embodiment of the present invention.

FIG. 1 illustrates producing a picture on a television screen by causing all the odd lines line to be illuminated and then causing all the even lines to be illuminated according to an embodiment of the present invention.

When TV's were invented in the 1920's, the type of phosphor used to produce the colors did not respond very fast. Therefore, it was impossible to display a picture in a single shot, because a flickering-strobing effect would appear moving down the screen as the glowing phosphor dots dimmed.

To solve this problem, it was decided that instead of illuminating lines on the screen consecutively, one at a time (e.g., 1, 2, 3, 4, 5, etc.), the lines would be illuminated every other line in a first pass (i.e., for example, the odd lines, e.g., 1, 3, 5, 7, 9, etc.) and the in-between lines would be illuminated in a second pass (i.e., for example, the even lines, e.g., 2, 4, 6, 8, 10, etc.).

In another embodiment, the first line to be illuminated may be the zero "0" line, wherein the even lines may be illuminated in the first pass (e.g., 0, 2, 4, 6, 8, etc.) and the odd lines may be illuminated in the second pass (e.g., 1, 3, 5, 7, 9, etc.).

FIG. 1 is a diagram 100 illustrating two passes 101 and 102 of illumination of a TV screen. The TV screen may comprise a plurality of lines that are shown numbered from top to bottom along respective sides of the illustrated screen passes 101 and 102, for example, 1, 2, 3, . . . , 14, and 15. In FIG. 1, 15 lines are shown for the sake of example. Modern TV line numbers will be discussed below with respect to modern TV screen technology.

The odd lines 103 (e.g., 1, 3, 5, etc.) may be illuminated first, wherein electron beams may follow path 107 horizontally across the TV screen (illuminating line 1 as the electron beams travel across line 1) until reaching the end of line 1, for example.

The electron beams may then follow path 109 (without applying the electron beam during traversal across the screen) traversing horizontally and diagonally across the screen to the beginning of line 3, wherein line 3 may be illuminated, in a similar manner as line 1 above, as the electron beams travel across line 3 until reaching the end of line 3, for example. The pattern may continue until each of the odd lines is illuminated. The electron beams may then traverse path 112 from line 15, for example, to even line 2, for example.

The even lines 104 (e.g., 2, 4, 4, etc.) may be illuminated next, wherein the electron beams may follow path 108, for example, horizontally across the TV screen (illuminating line 2 as the electron beams travel across line 2) until reaching the end of line 2. The electron beams may then follow path 110 (without applying the electron beams during traversal) traversing horizontally and diagonally across the screen to the beginning of line 4, wherein line 4 may be illuminated, in a similar manner as line 2 above, as the electron beams travel across line 4 until reaching the end of line 4, for example.

The pattern may continue until each of the odd lines is illuminated. The electron beams may then traverse path 111 from line 14, for example, to odd line 1, for example, wherein a complete picture may be completely rendered. The above-described method allows a whole picture to be produced in two very fast scans/illuminations (odd line scan/illumination and even line scan/illumination) and allowing enough time for the phosphor dots to recover. Thus, preventing the flickering-strobing effect.

The TV industry is dominated by two main standards for TV design: PAL and NTSC. PAL stands for Phase Alternating Line and NTSC stands for National Television Systems Committee. NTSC is the color video standard used in the United States, Canada, Mexico, and Japan. PAL is the standard used in Europe, Hong Kong, and the Middle East.

Due to the electric system used in the U.S., (alternating current operating at 60 cycles per second) it was decided to scan/illuminate the lines of the NTSC TV screen at approximately 60 Hz (60 half frames per second) which produces 30 whole pictures every second. NTSC resolution is about one sixth less than that of PAL. NTSC uses 525 horizontal lines of which 483 lines conventionally make up the active picture.

The PAL standard is based upon the NTSC standard, but designed to correct color problems produced by phase errors in the transmission path, for example. PAL resolution is 625 horizontal lines of which 540 lines are used for the active picture. Due to European electric standards, (alternating current operating at 50 cycles per second), it was decided to interlace PAL lines every other line at 50 Hz producing 25 whole frames every second.

A whole picture may be referred to as a frame. A half frame (every other line illuminated odd lines or even lines) may be referred to as a field. Two fields (the odd line field (half frame) and the even line field (half frame)) together comprise a frame. The two fields may also individually be referred to as the top field and the bottom field. The top field may be referred to the field having the first or top line on the TV screen. The top line may be odd (e.g., 1) or even (e.g., 0) depending upon the particular definition employed.

Figure 2:
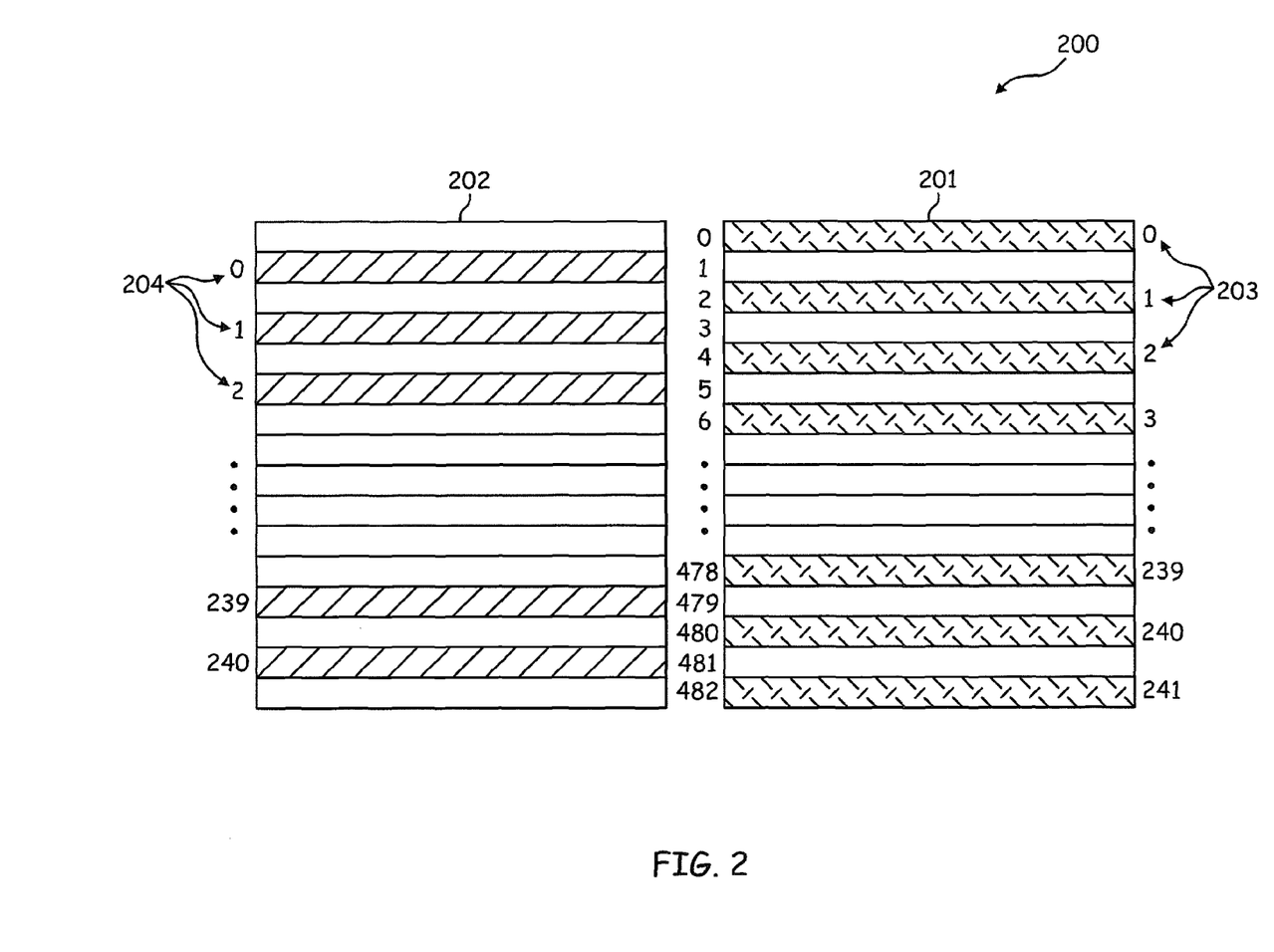
FIG. 2 illustrates a pair of illuminated fields in accordance with various aspects of the present invention.

FIG. 2 is a diagram 200 illustrating two separated, illuminated fields 201 and 202 (half frames) of a whole picture or frame. The top field in FIG. 2 may be field 201 because in this embodiment the first or top line is the even zero "0" line.

In the top field 201, the even lines 203 (e.g., 0, 1, 2, 3, 4, . . . , 240, 241) are illuminated and the odd, in-between lines are not illuminated. In the bottom field 202, the odd lines 204 (e.g., 0, 1, 2, 3, 4, . . . , 239, 240) are illuminated and the even, in-between lines are not illuminated. The two fields 201 and 202 together may create a complete frame and a whole picture.

Aspects of the present invention may be found improving a picture display quality. In an embodiment according to the present invention, a flickering or strobing effect occurring during display of a video picture may be prevented and/or eliminated by employing a method according to the present invention.

Because the number of odd and even lines are not equal, a situation occurs wherein a bottom pair of illuminable lines may be separated by a non-illuminable line. The bottom pair of illuminable lines may be illuminated when the field to which the illuminable lines belong is illuminated. However, the non-illuminable line remains un-illuminated during the illumination of both fields, resulting in a flickering or strobing effect, which may be noticeable and may distract and irritate a video display viewer. Conventionally, one line, which may be the last illuminable line on a TV screen was discarded, but merely discarding the last line of illuminable display was insufficient to solve the problem because an uneven number of illuminable lines in the respective fields results.

During post-processing of video, post-processor video filters may be employed to process the video to be displayed. The post-processor video filters are adapted to process fields having even numbers of lines in each field. In an instance where one or both fields comprise an odd or uneven number of lines, the post-processor video filters may fail to operate.

In an embodiment according to the present invention, no active (illuminable) lines in one field may exist below a blanked (non-illuminable) line in a corresponding other field.

In an embodiment according to the present invention, each field may comprise an even number of illuminable lines. The number of illuminable lines may or may not be the same in each field (i.e., the fields may or may not comprise an equal and even number of illuminable lines in each field).

In an embodiment according to the present invention, the frame (whole picture) may comprise 483 total illuminable lines. Wherein after processing to prevent flickering or strobing, according to an embodiment of the present invention, for example, the top field may comprise 240 illuminable lines and 2 non-illuminable (blanked) lines and the bottom field may comprise 240 illuminable lines and 1 non-illuminable (blanked) line.

The non-illuminable (blanked) lines may be the last three lines, for example, at the bottom of the display screen, in an embodiment according to the present invention. The non-illuminable (blanked) lines may be the first three lines, for example, at the top of the display screen, in another embodiment according to the present invention.

FIG. 2 also illustrates a TV screen adapted with 483 illuminable lines of display (numbered and shown between field 201 and field 202). As previously set forth, the top frame 201 (even lines) and the bottom frame 202 (odd lines) together make up a frame or a whole picture to be displayed. The lines in FIG. 2 are numbered and shown as even lines 0, 1, 2, 3, . . . , 239, 240, and 241 and as odd lines 0, 1, 2, 239, 240.

Alternatively, it may be seen that there are 242 even lines and 241 odd lines, for a total of 483 illuminable lines. Because the number of lines in one field is odd, the post-processor video filters are unable to process the field. As set forth above, the numbers of lines in each filed must be even according to an embodiment of the present invention.

Aspects of the present invention may be found in determining a number of lines to illuminate and blanking an excess line(s) determined to not be illuminated in order to prevent and eliminate a flickering-strobing effect in a television display.

The original 483 illuminable lines comprising the frame or picture to be displayed may comprise 241 odd lines and 242 even lines. In an embodiment according to the present invention, the odd and even fields may be processed wherein 240 odd lines and 240 even lines may be illuminated and the 3 additional, remaining lines may be blanked (left un-illuminated). The three, additional, remaining lines may be blanked (i.e., not illuminated) during field/frame/picture creation/processing.

According to an embodiment of a method set forth in the present invention, by equalizing the number of odd and even lines to be illuminated and by blanking the additional, remaining lines, the flickering-strobing effect may be prevented and eliminated, thus creating a more enjoyable visual display experience.

Figure 3:
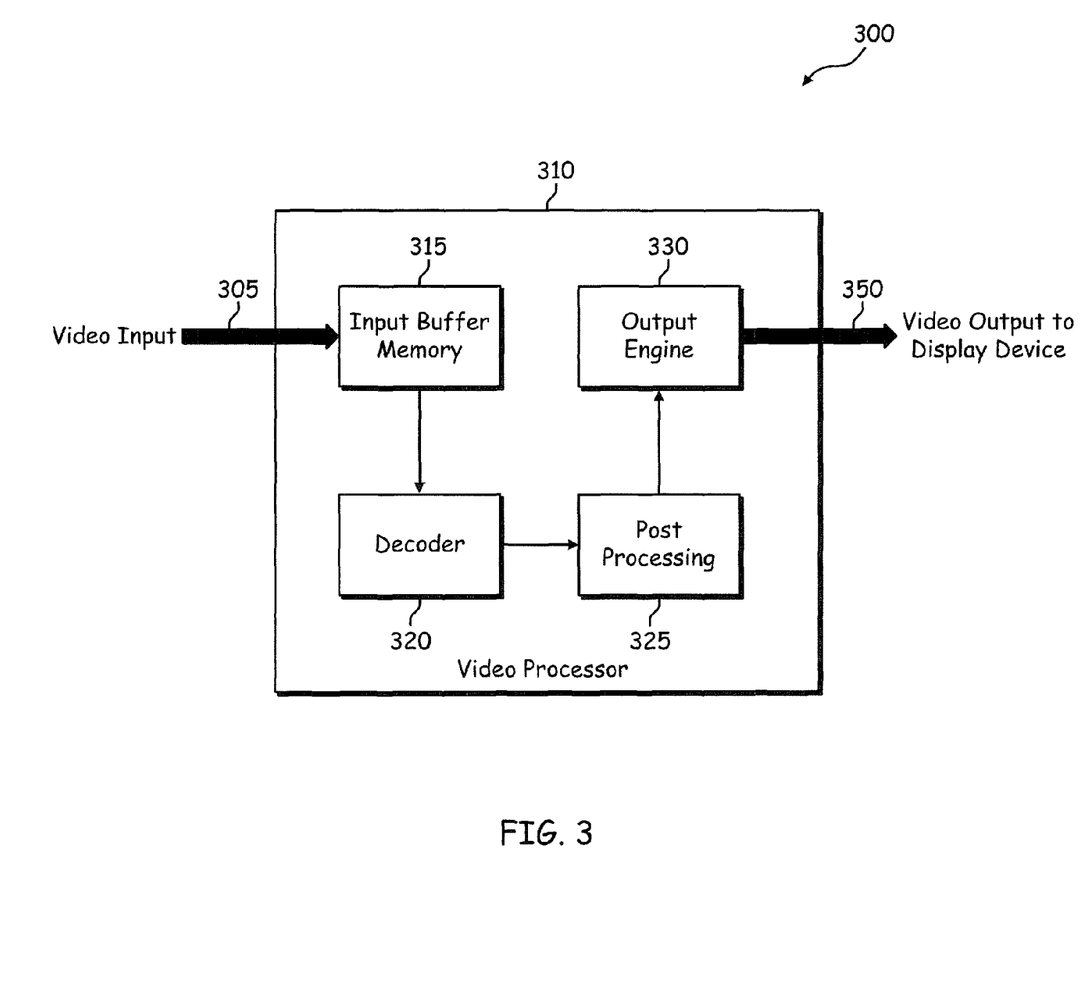
FIG. 3 is a diagram illustrating a video processor in accordance with various aspects of the present invention.

FIG. 3 is a block diagram 300 illustrating a video processor 310 according to an embodiment of the present invention. The video processor 310 may comprise an input video buffer memory 315 for receiving a video input 305. The video input 305 may be a wired or wireless communication device.

The video information transmitted via the video input 305 may be stored in the input buffer memory 315. The video processor 310 may also comprise a decoder 320 for decoding and/or decompressing encoded and/or compressed video information.

The video processor 310 may also comprise a post-processing unit 325. The post-processing unit 325 may be adapted to determine the number of odd and even lines and based upon the number of odd and even lines determine the number of line to be blanked to prevent and eliminate a flickering and strobing effect.

The video processor 310 may also comprise an output engine 330. The output engine 330 may be adapted to assemble the processed video information for transmission via a video output 350 to a display device.

Figure 4:
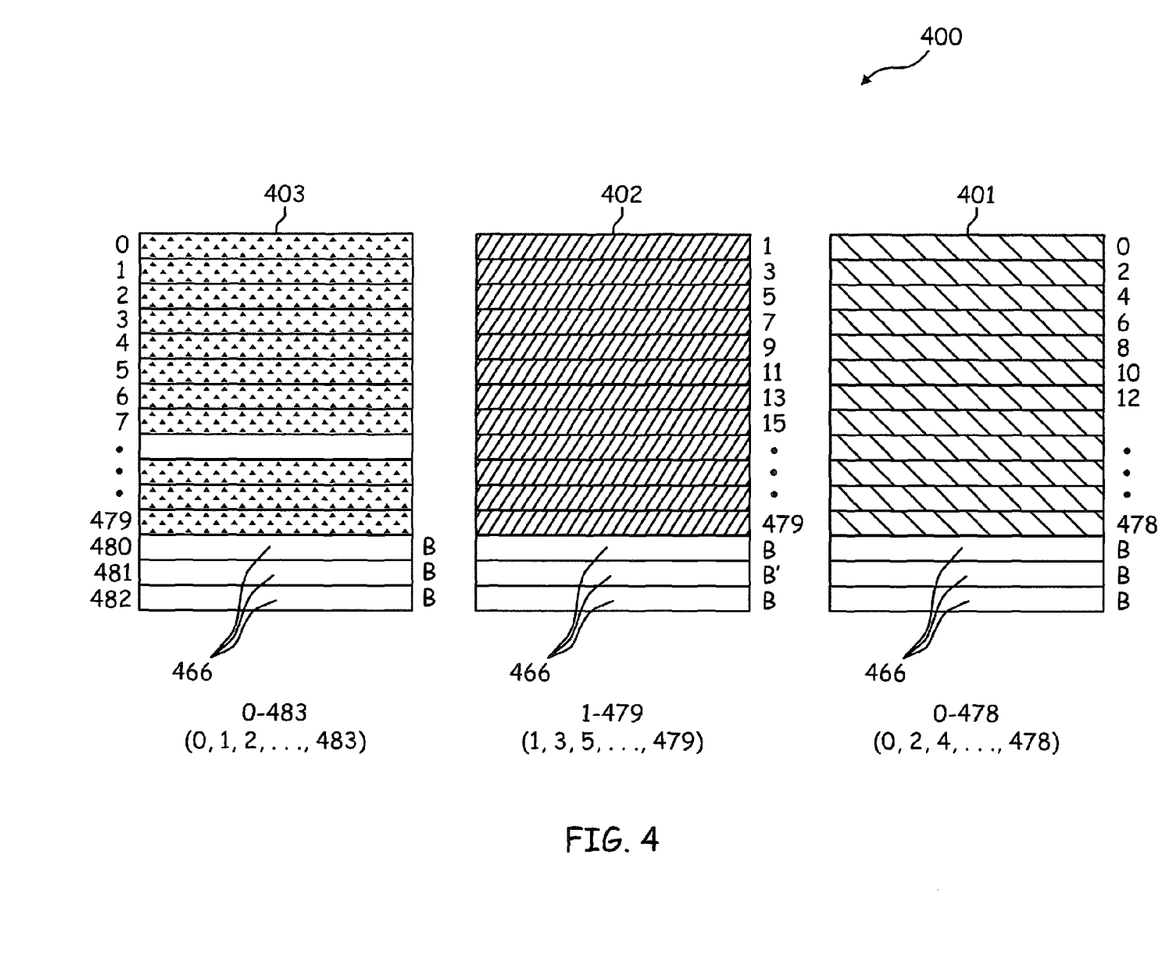
FIG. 4 is a diagram illustrating a displayed video frame and associated half frames (fields) in accordance with various aspects of the present invention.

FIG. 4 is a diagram 400 illustrating a displayed video frame 403 and associated half frames 401 and 402 (fields) after processing in accordance with an embodiment of the present invention. FIG. 4 illustrates a displayed video frame 403 comprising 483 illuminable lines. The last three illuminable lines 466 (480, 481, and 482) have been blanked in FIG. 4.

The odd field 402 (only showing the illuminated odd lines 1, 3, 5, . . . , and 479, and not showing the unilluminated even lines) also illustrates the last three illuminable lines 466 being blanked and identified with the letter B. The even field 401 (only showing the illuminated even lines 0, 2, 4, . . . , and 478, and not showing the unilluminated odd lines) also illustrates the last three illuminable lines 466 being blanked and identified with the letter B.

Figure 5:
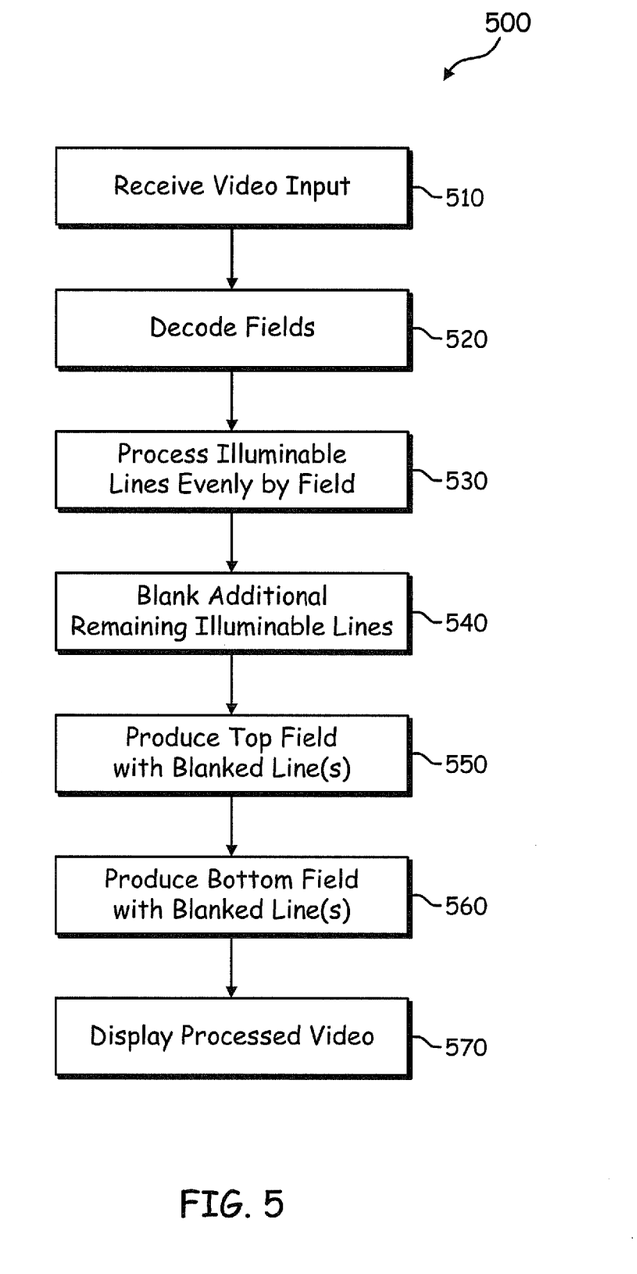
FIG. 5 is a flow diagram illustrating a method of preventing and eliminating a flickering strobing effect in displayed video in accordance with another embodiment of the present invention.

FIG. 5 is a flow diagram 500 illustrating a method of preventing and eliminating a flickering-strobing effect in displayed video in accordance with an embodiment of the present invention. The method may comprise receiving video information from a video input 510.

The video input may comprise a wired or wireless communication device adapted to transmit video information to a video processor for processing. The received video information may be stored in a video buffer memory until such time as the video information may be decoded.

The video information may be decoded field-by-field 520 in accordance with an embodiment of the present invention. Associated half frames (fields) may be processed based upon the number of illuminable lines available in an associated video display device. The illuminable lines may be processed, such that each field may comprise an even number of corresponding, illuminable lines 530. The fields, however, are not required to have the same number of lines.

In an embodiment according to the present invention, no active lines in one field may be below a blanked line in a corresponding field.

After processing the illuminable lines among the associated fields, any additional, remaining illuminable lines may be blanked 540 (not illuminated). The last line(s) of a corresponding field may be blanked in accordance with an embodiment of the present invention.

Prior to transmission to an associated video display device, a top field may be produced having at least one blanked line 550. Additionally, a bottom field may be produced having at least one blanked line 560.

The processed video comprising a processed top field and a processed bottom field each comprising at least one blanked line may be transmitted and displayed on a video display device in accordance with an embodiment of the present invention.

Aspects of the present invention may be found in applying the following method of calculation in producing a top field and a bottom field and in determining number of lines to be blanked in accordance with an embodiment of the present invention.

If it is assumed that the top field has more illuminable lines than the bottom field, and the number of illuminable lines of the top field is even, then the following equation may be applied to the top field calculation:

$$M_T = n/2 - 1.$$

wherein $M_T$ comprises the number of lines to be illuminated in the top field and n comprises a total number of illuminable lines associated with a particular video display device.

If it is assumed that the bottom field has fewer illuminable lines than the top field, and the number of illuminable lines of the bottom field is odd, then the following equation may be applied to the top field calculation:

$$M_B = (n-1)/2.$$

wherein $M_B$ comprises the number of lines to be illuminated in bottom field and n comprises a total number of illuminable lines associated with a particular video display device.

The method may also comprise calculating a number of lines to be blanked employing the following equation:

$$B = n - (M_B + M_T)$$

wherein $M_B$ comprises the number of lines to be illuminated in one of the top field and the bottom field, $M_T$ comprises the number of lines to be illuminated in another of the top field and the bottom field, n comprises a total number of illuminable lines associated with a particular video display device, and B comprises a total number of lines to be blanked.

Of course, the above equations may be applied to the opposite of the top and bottom fields according to parameters associated with the top and bottom fields, for example, when the top field begins with line 1 instead of line 0, making the top field a field of odd lines and making the bottom field a field of even lines. A method in accordance with an embodiment of the present invention, may be applicable to video display devices employing the NTSC standard or the PAL standard.

While the present invention has been described with reference to certain embodiments, it will be understood by those skilled in the art that various changes may be made and equivalents may be substituted without departing from the scope of the present invention.

In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of preventing and eliminating undesirable effects in displayed video, the method comprising:
    receiving video information;
    decoding the video information;
    processing a number of illuminable lines associated with a video frame;
    blanking a remainder of the illuminable lines, wherein blanking the remainder of the illuminable lines prevents and eliminates undesirable effects in the displayed video; and
    wherein B=n mod 4, wherein B=the number of blanked lines, and n=number of displayable lines on the display; and wherein $M_b = M_t = (n-B)/2$, wherein $M_t$=number of displayable lines in a top field, and wherein $M_b$=number of displayable lines in a bottom field.

2. The method according to claim 1, wherein receiving the video information comprises receiving the video information from a video input device.

3. The method according to claim 2, wherein the video input device may comprise a wired or wireless communication device adapted to transmit video information.

4. The method according to claim 1, further comprising storing the video information in a video buffer memory until the video information is decoded.

5. The method according to claim 1, wherein decoding the video information further comprises decoding the video information field-by-field.

6. The method according to claim 1, wherein processing the number of illuminable lines associated with a video frame is based upon a number of illuminable lines available in an associated video display device.

7. The method of claim 1, wherein the display comprises 483 displayable lines.

8. A video processor adapted to prevent and eliminate undesirable effects in a displayed video, the video processor comprising:
    a video decoder for one of decoding and decompressing one of encoded and compressed video information;
    a video post-processing unit adapted to determine a number lines to be illuminated on a particular video display device and a number of lines to be blanked in order to prevent and eliminate undesirable effects in the displayed video; and
    wherein B=n mod 4, wherein B=the number of blanked lines, and n=number of displayable lines on the display; and wherein $M_b = M_t = (n-B)/2$, wherein $M_t$=number of displayable lines in a top field, and wherein $M_b$ =number of displayable lines in a bottom field.

9. The video processor according to claim 8, further comprising a video input device adapted to transmit video to the video processor.

10. The video processor according to claim 9, wherein the video input device comprises one of a wired and wireless communication device.

11. The video processor according to claim 8, further comprising a video buffer memory for storing received video information.

12. The video processor according to claim 8, further comprising an output engine adapted to assemble processed video information for transmission via a video output to a display device.

13. The video processor according to claim 8, further comprising processing the video information into a processed top field comprising an even number of illuminable lines and a processed bottom field comprising an even number of illuminable lines.

14. The video processor according to claim 13, further comprising processing the video information wherein each field comprises at least one blanked line.

* * * * *

UNITED STATES PATENT AND TRADEMARK OFFICE
CERTIFICATE OF CORRECTION

Page 1 of 1

PATENT NO. : 7,839,454 B2
APPLICATION NO. : 11/299165
DATED : November 23, 2010
INVENTOR(S) : Rogers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this
Eleventh Day of October, 2011

David J. Kappos
*Director of the United States Patent and Trademark Office*